US 8,209,356 B1

United States Patent
Roesler (10) Patent No.: US 8,209,356 B1
(45) Date of Patent: Jun. 26, 2012

(54) DIRECT COMMAND LINE PARSER

(75) Inventor: Ralph Roesler, Gaggenau (DE)

(73) Assignee: Marvell International Ltd., Hamilton (BM)

(*) Notice: Subject to any disclaimer, the term of this patent is extended or adjusted under 35 U.S.C. 154(b) by 488 days.

(21) Appl. No.: 12/352,814

(22) Filed: Jan. 13, 2009

Related U.S. Application Data (60) Provisional application No. 61/020,907, filed on Jan. 14, 2008.

(51) Int. Cl.
G06F 17/30 (2006.01)
G06F 9/44 (2006.01)
G06F 3/00 (2006.01)

(52) U.S. Cl. ............ 707/802; 717/108; 715/738

(58) Field of Classification Search ............ None
See application file for complete search history.

(56) References Cited

U.S. PATENT DOCUMENTS

| | | | | |
|---|---|---|---|---|
| 5,317,740 A * | 5/1994 | Sites | | 717/129 |
| 5,666,534 A * | 9/1997 | Gilbert et al. | | 713/1 |
| 6,625,590 B1 * | 9/2003 | Chen et al. | | 709/223 |
| 6,668,368 B1 * | 12/2003 | Hernandez, III | | 717/115 |
| 7,499,902 B2 * | 3/2009 | Datla et al. | | 706/55 |
| 7,721,304 B2 * | 5/2010 | Datla et al. | | 719/328 |
| 2004/0083280 A1 * | 4/2004 | Houston et al. | | 709/223 |
| 2005/0004973 A1 * | 1/2005 | Snover et al. | | 709/200 |
| 2005/0256834 A1 * | 11/2005 | Millington et al. | | 707/1 |
| 2008/0147721 A1 * | 6/2008 | Wories | | 707/103 R |

* cited by examiner

Primary Examiner — Tarek Chbouki (57) ABSTRACT

Various embodiments provide a direct command line parser (DCLP) that enables command line input to be handled directly as a user strikes a key. Specifically, instead of waiting for the user to confirm a complete command line by pressing the Enter key, key input is evaluated immediately as the user inputs individual keystrokes. In addition, various embodiments can enable a user's input to be parsed directly and provide a command history for CLI applications. Using the inventive approach, various shells such as UNIX shells, can enable previously executed commands to be retrieved, edited, and executed again through the use of particular keystrokes. In addition, the inventive approach provides a user-friendly feature which can easily accommodate a large variety of CLI applications.

29 Claims, 6 Drawing Sheets

DIRECT COMMAND LINE PARSER

RELATED APPLICATION

This application claims priority to U.S. Provisional Application No. 61/020,907, filed on Jan. 14, 2008, the disclosure of which is incorporated by reference herein.

BACKGROUND

A Command Line Interface (CLI) refers to a user interface that can be implemented by a program such as a command line interpreter or shell. A CLI can be used to enable a user to interact with a computer operating system or system software by typing commands to perform particular tasks. When a user interacts with a CLI, the user can enter a text command and the system waits for the user to conclude submission of the text command by the user pressing the Enter key. Responsively, the command line interpreter receives the command, analyzes the command and then launches the entered command. When the command is completed, the launched command usually returns output to the user in the form of text lines on the CLI.

One of the problems associated with CLIs stems from terminal settings which can cause unwanted or distracting characters to appear on a user's screen during entry of text commands. Terminal settings refer to specific characteristics of text-based interface terminal programs for enabling a user to type commands. Depending on the characteristics or settings of a terminal being used to enter commands, unwanted characters can appear differently. For example, the table just below includes an example Output column that illustrates unwanted characters for corresponding keyed input.

| Output | Key |
| --- | --- |
| "^]]A" | <ARROW-UP> |
| "^]]B" | <ARROW-DOWN> |
| "^]]C" | <ARROW-LEFT> |
| "^]]D" | <ARROW-RIGHT> |
| "^[0Q" | <F2> |
| "^[[19~" | <F8> |
| "^?" | <DELETE> |

The problem is that the raw keycode of special keys like the <DELETE> key is actually a sequence of multiple bytes that terminal emulation is not able to correctly handle. Having unwanted or distracting characters appear on the user's screen provides an undesirable user experience.

Further, many CLIs only allow the user to review and edit a single, current command. Such CLIs do not provide an opportunity for a user to review or edit previous commands or to reuse previously-entered commands.

SUMMARY

This Summary is provided to introduce subject matter that is further described below in the Detailed Description and Drawings. Accordingly, the Summary should not be considered to describe essential features nor used to limit the scope of the claimed subject matter.

In at least one embodiment, a system comprises one or more computer readable storage media; and a direct command line parser embodied on the one or more computer readable storage media and configured to interface with one or more applications, the direct command line parser comprising: a generic direct command line parser module configured to expose a set of public interfaces to said one or more applications; and one or more system-specific direct command line parser modules configured to expose a set of private interfaces to said generic direct command line parser module.

In another embodiment, a method comprises presenting a command line interface that is configured to enable a user to enter input strings corresponding to commands; receiving one or more input strings entered by the user; and enabling the user to browse through and edit previously entered input strings associated with multiple user-entered commands.

Various other embodiments comprise means for presenting a command line interface that is configured to enable a user to enter input strings corresponding to commands; means for receiving one or more input strings entered by the user; and means for enabling the user to browse through and edit previously entered input strings associated with multiple user-entered commands.

BRIEF DESCRIPTION OF THE DRAWINGS

The same numbers are used throughout the drawings to reference like features.

DETAILED DESCRIPTION

Overview

Various embodiments provide a direct command line parser (DCLP) that enables command line input to be handled directly as a user strikes a key. Specifically, instead of waiting for the user to confirm a complete command line by pressing the Enter key, key input is evaluated immediately as the user inputs individual keystrokes. User input can include, by way of example and not limitation, ordinary ASCII and UNICODE characters, as well as control keys such as <Tab>, <Arrow Up>, <Arrow Down>, and the like.

In addition, various embodiments can enable a user's input to be parsed directly and provide a command history for CLI applications. Using the inventive approach, various shells such as UNIX shells, can enable previously executed commands to be retrieved, edited, and executed again through the use of particular keystrokes such as, for example, the <Arrow Up> and <Arrow Down> keys. In addition, the inventive approach provides a user-friendly feature which can easily accommodate a large variety of CLI applications. To this end, the discussion below describes a generally generic implementation that can be added to a wide variety of programs on a wide variety of operating systems.

In the discussion that follows, a section entitled "Operating Environment" is provided and describes one example operating environment in which one or more embodiments can be employed. Following this, a section entitled "Example Direct Command Line Parser" is provided and describes an example direct command line parser in accordance with one or more embodiments. Next, a section entitled "Example Public Interfaces" provides examples of public interfaces in accordance with one or more embodiments. Next, a section entitled "Example Private Interfaces" is provided and describes examples of private interfaces in accordance with one or more embodiments. Following this, a section entitled "Implementation Example Using Linux" provides an implementation example in which Linux is used as an operating system. This section includes several subsections including "Terminal Settings", "Data Structures", "Input Handler", "Parsing Example", and "Flushing Output". Next, a section entitled "Sample Usage" is provided and describes a sample usage in accordance with one or more embodiments. Following this, a section entitled "File Layout" is provided and describes an example file layout in accordance with one or more embodiments. Following this, a section entitled "Extensions" is provided and describes several enhancements in accordance with one or more embodiments. This section includes several subsections including "Insert Mode", "Advanced History Search", "Special Keys Notification", and "Multiple Operating System Support". Last, a section entitled "Example Method" describes an example method in accordance with one or more embodiments.

Operating Environment

Figure 1:
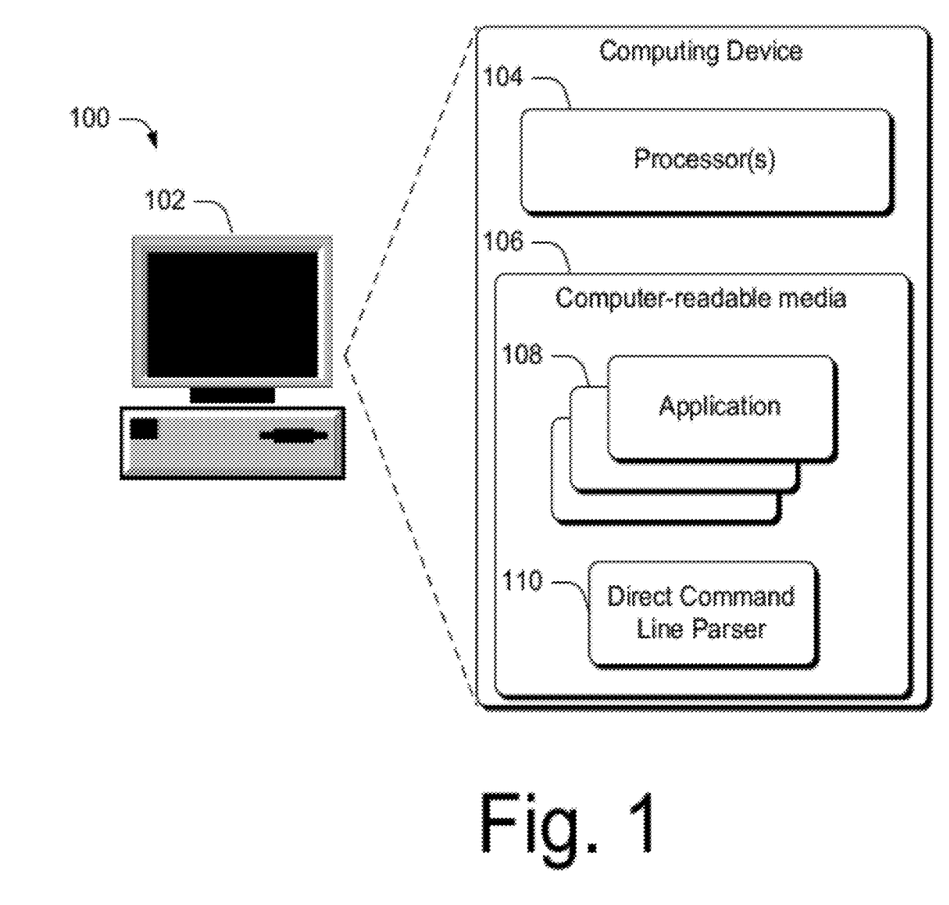
FIG. 1 is a block diagram of an example operating environment in accordance with one or more embodiments.

FIG. 1 illustrates an example operating environment in accordance with one or more embodiments generally at 100. In the illustrated and described embodiment, operating environment 100 includes a computing device 102 that can be any suitable type of computing device including, by way of example and not limitation, a desktop computing device, a laptop computer device, a server, a hand-held computing device, a network-connected or network-connectable computing device, and the like.

Computing device 102 includes one or more processors 104 and one or more computer-readable media 106. The computer readable media 106 can include both volatile and nonvolatile forms of computer readable media including, by way of example and not limitation, computer readable storage media. In addition, computer-readable media 106 can include, embodied thereon, one or more applications 108, one or more operating systems, and a direct command line parser 110 that can operate as described above and below. The direct command line parser 110 can be embodied in any suitable form to perform the function described herein. In the example just below, the direct command line parser 110 resides in the form of a static library that is linked to one or more applications 108. Of course, other embodiments of the direct command line parser can be utilized without departing from the claimed subject matter.

Example Direct Command Line Parser

Figure 2:
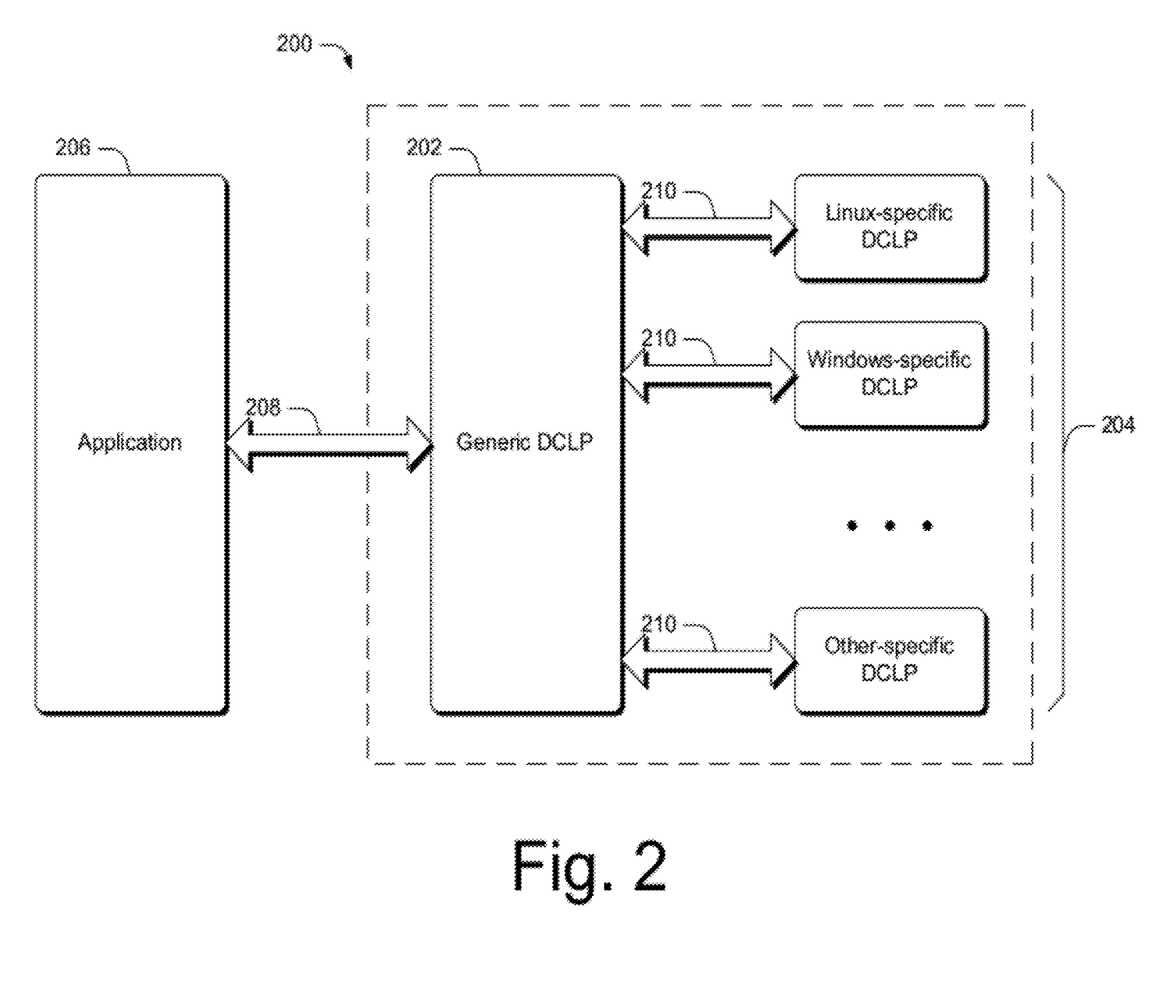
FIG. 2 illustrates an example direct command line parser in accordance with one or more embodiments.

FIG. 2 illustrates an example direct command line parser in accordance with one or more embodiments generally at 200. In the illustrated and described embodiment, direct command line parser 200 includes a generic direct command line parser module 202 and one or more system-specific direct command line parser modules generally indicated at 204. In at least some embodiments, the system-specific direct command line parser modules 204 can be operating system-specific direct command line parser modules that are specific to a particular operating system. For example, in at least some embodiments, one of the operating system-specific direct command line parser modules 204 can be Linux-specific, Windows®-specific, or any other operating system-specific direct command line parser module. In addition, one or more applications, such as application 206, can interface with the direct command line parser 200 as described below.

In one or more embodiments, the direct command line parser 200 resides as a static library that is linked to an application such as application 206. The application 206 can run in the user space of a particular system and can include other components and interfaces which are not described herein.

In at least some embodiments, direct command line parser 200 includes a set of public interfaces 208 that are exposed to applications, and a set of private interfaces 210 which are internal to the direct command line parser 200 and which are not exposed or visible to applications. To this end, generic direct command line parser module 202 exposes the set of public interfaces, and the system-specific direct command line parser modules 204 expose the set of private interfaces. Example sets of public and private interfaces are described just below.

Example Public Interfaces

In one or more embodiments, the public interfaces provide various direct command line parser (DCLP) functions that can be invoked by an application. These functions include, by way of example and not limitation, an initialization function, a set prompt function, and a read line function. Specific implementation examples of the DCLP functions appear just below:

dclp_init( )
Prototype: void dclp_init(const char *);
Description: Initialization function of the DCLP library which is called prior to any other function of the DCLP. It sets initial values for various variables and can also update the prompt according to the application needs.
Parameters: either pointer to a prompt string or NULL if DCLP uses a default one
Return: -
dclp_setprompt( )
Prototype: void dclp_setprompt(const char *);
Description: Updates the prompt that is displayed on command line when waiting for user input. Any string up to 32 characters can be used.
Parameters: pointer to a prompt string
Return: -

--- dclp_readline( )
Prototype: int dclp_readline(char **);
Description: Main function of the DCLP that evaluates user input and eventually returns the user confirmed input data. When this function is invoked, the user can also browse through previous input strings using the <ARROW_UP> and <ARROW_DOWN> keys, edit them, and can finally confirm a particular string using the <RETURN> key.
If the <RETURN> key is hit by the user, this function returns and the invoking application can check the return code.
Parameters: Pointer to a pointer which refers to the input line the user has confirmed.
Return: 0 success-the input string contains valid data
    1 failure-no valid data

---

Example Private Interfaces

In the example described just below, private Linux DCLP functions are described to provide the reader with context and examples of a specific implementation in the Linux environment. It is to be appreciated and understood, however, that other private operating system-specific DCLP functions can be utilized with operating systems that are the same or different without departing from the claimed subject matter.

In one or more embodiments, the private DCLP functions can be invoked by a generic direct command line parser module, such as parser module 202 in FIG. 2. These functions include, by way of example and not limitation, a disable canonical mode function, an enable canonical mode function, a read line function, and a set prompt function. Specific implementation examples of the private Linux DCLP functions appear just below:

--- dclp_linux_disable_canonical_mode( )
Prototype: int dclp_linux_disable_canonical_mode(void);
Description: Disables canonical mode in current terminal settings, i.e., all user input is directly handled by the DCLP and no longer buffered.
Parameters: -
Return: 0 success-the terminal is now in non-canonical mode
       1 failure
dclp_linux_enable_canoncial_mode( )
Prototype: int dclp_linux_enable_canonical_mode(void);
Description: Reverses any previous change of the terminal settings and enables canonical mode again. This canonical mode is the initial default for all CLI applications.
Parameters: -
Return: 0 success-the terminal is now in canonical default mode
       1 failure
dclp_linux_readline( )
Prototype: int dclp_linux_readline(char **);
Description: Main function of the DCLP that evaluates user input and eventually returns the user confirmed input data. When this function is invoked, the user can also browse through previous input strings using the <ARROW_UP> and <ARROW_DOWN> keys, edit them, and can finally confirm a particular string using the <RETURN> key.
If the <RETURN> key is hit by the user, this function returns and the invoking application can check the return code.
Parameters: Pointer to a pointer which refers to the input line the user has confirmed.
Return: 0 success-the input string contains valid data
       1 failure-no valid data
dclp_linux_setprompt( )
Prototype: void dclp_linux_setprompt(const char *);
Description: Updates the prompt that is displayed on command line when waiting for user input. Any string up to 32 characters can be used.
Parameters: pointer to a prompt string
Return: -

---

Implementation Example Using Linux

The example described just below provides an implementation example using Linux-specific code. This is done for reasons that include providing the reader with a tangible implementation example. It is to be appreciated and understood, however, that the inventive techniques described herein can be utilized with other operating systems without departing from the spirit and scope of the claimed subject matter.

Terminal Settings

In one or more embodiments, command line input modes are modified via terminal settings. When a CLI application is started, the application applies the current terminal settings, regardless of whether the application is running under a Linux Graphical Environment (GUI mode) or on a plain console. In at least some embodiments, by default, a canonical input mode is activated for CLI applications. That is, in a canonical input mode, a user can edit a single command line as much as desired and finally confirms edits by pressing <RETURN>, i.e. the Enter key. In the canonical input mode, as will be appreciated by the skilled artisan, it is not possible to browse any previous commands and edit them again. That is, in the canonical input mode, only the current command line can be edited.

In one or more embodiments, a non-canonical mode provides full control over all input keys the user presses, because associated inputs are forwarded directly to the direct command line parser (DCLP) without a meaningful delay or a need to press <RETURN> first. This allows the DCLP to provide a command line history that can be browsed.

The following code snippet shows how current terminal settings are obtained by the DCLP.

```
#include <termios.h>
#include <unistd.h>
static struct termios new_tty, old_tty;
if (tcgetattr(0, &old_tty)) {
    return errno; /* return precise error number */
}
```

The structure termios contains all terminal settings. A termios variable c_lflag indicates if the canonical mode is enabled. In addition, the DCLP also disables what is referred to as a direct echo, as indicated in the code snippet below. Usually, default terminal settings or characteristics automatically echo any character that has been typed on the keyboard on the screen. This direct echo occurs immediately without any chance to filter unwanted or distracting characters from the input stream.

```
new_tty.c_lflag  &=~(ICANON|ECHO);  /* disable ICANON and ECHO flag */
new_tty.c_cc[VMIN]=1; /* minimum number characters */
new_tty.c_cc[VMTIME]=0; /* timeout in deci-seconds */
if (tcsetattr(0, TCSAFLUSH, &new_tty)) {
    return errno; /* return precise error number */
}
```

The termios variable c_cc[VMIN] contains the minimum characters for non-canonical reads and the variable c_cc[VTIME] its corresponding timeout in deci-seconds.

Data Structures

In one or more embodiments, due to the fact that the DCLP is responsible for every single keystroke, each single character is maintained separately. A single character is stored in a structure called rawkeyinfo which is reproduced just below.

```
struct rawkeyinfo {
unsigned char len; /* len of keycode stored in variable 'key' */
unsigned int key; /* maximum 4 bytes keycode */
};
```

In order to support both ASCII and UNICODE characters, each keycode is represented by a four byte value (unsigned int). The number of used bytes per keycode is stored in the len variable.

In one or more embodiments, a command line consists of several keys. In addition to the rawkeyinfo structure holding a single keycode, additional control fields are maintained by the DCLP for each command line. These control fields and the rawkeyinfo structure are maintained by the DCLP in a combined structure called rawstringinfo, produced just below.

```
#define MAX_KEYTABLE_ENTRIES 32
struct rawstringinfo {
unsigned char num; /* num valid keycodes in 'key[ ]' */
unsigned char nextKeyIdx; /* cursor idx to current 'key[ ]' */
struct rawkeyinfo key[MAX_KEYTABLE_ENTRIES];
};
```

The DCLP also keeps track of the cursor position. If the user then strikes a new key, this new key is added to the corresponding location in the key [ ] array and the nextKeyIdx variable holding the cursor location is incremented by one.

The current command line the user is editing is called keytable, and is indicated just below.

static struct rawkeyinfo keytable;

All previous command lines are maintained in an array of multiple rawstringinfo variables, described just below.

#define MAX_HISTORY_LINES 25
    static struct rawstringinfo history_keytable[MAX_HISTORY_LINES];
    static unsigned char currDisplayHistoryKeyIdx;
    static unsigned char numTotalHistoryKeys;

In one or more embodiments, two additional control variables are utilized for the DCLP to keep track of the entry of the history_keytable[ ] which is currently displayed and can be edited.

Due to the fact that the CLI application can use a self-defined prompt, an overwritable character array is provided which can be filled with any value the CLI application wants to use as prompt, an example of which is provided just below.

#define MAX_LEN_PROMPT 32
    static char prompt[MAX_LEN_PROMPT]=">> "; /* default prompt*/

Figure 3:
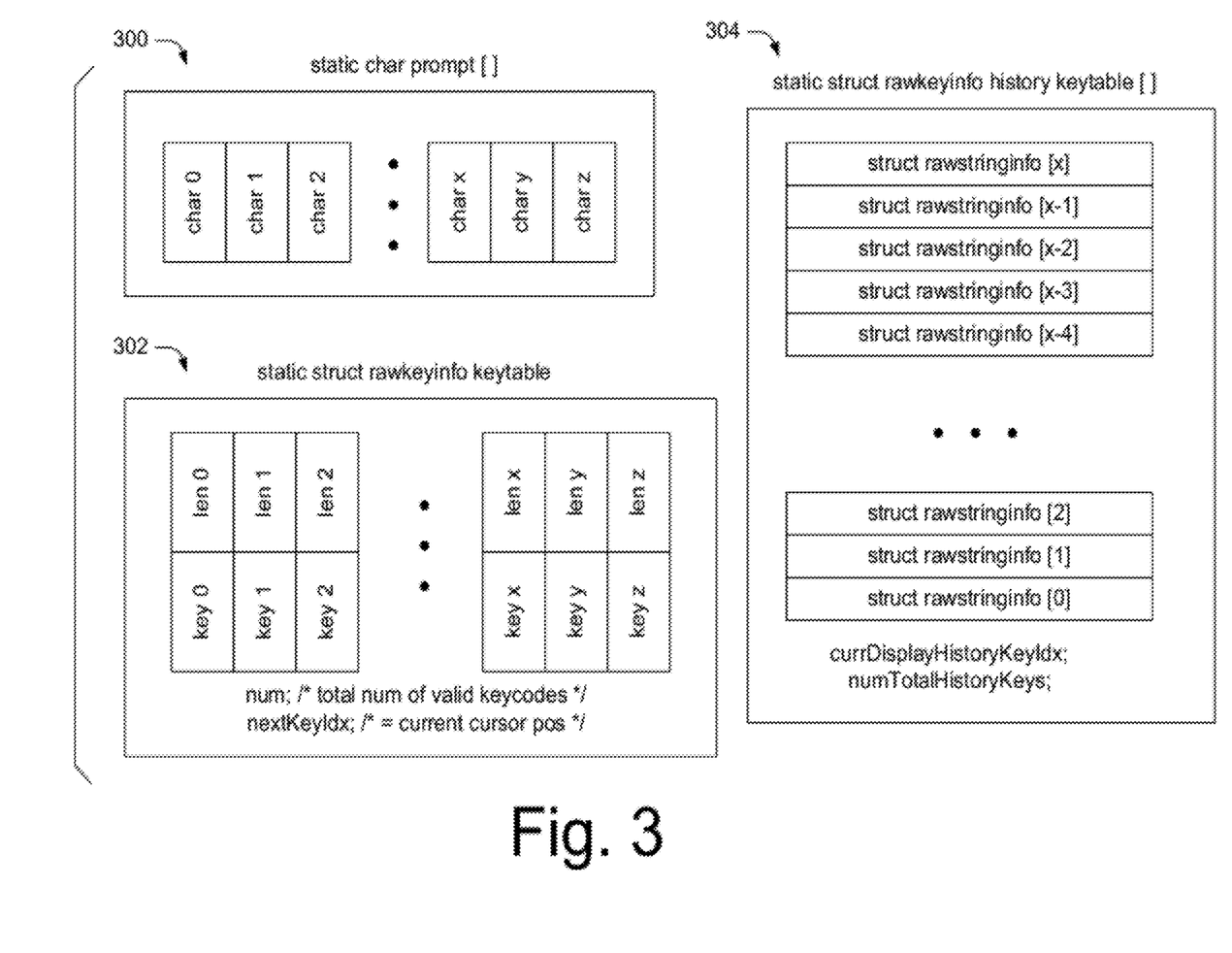
FIG. 3 illustrates various data structures in accordance with one or more embodiments.

FIG. 3 summarizes the main data structures described above. Specifically, the static char prompt [ ] structure is shown generally at 300, the static struct rawkeyinfo keytable [ ] is shown generally at 302, and the static struct rawstringinfo history keytable [ ] is shown generally at 304.

Input Handler

In one or more embodiments, whenever the dclp_readline( ) function is invoked, the DCLP clears the current command line, displays its prompt, and waits for new input on stdin. New input on stdin can either be a certain keycode that is to be added to the current command line or some special key such as <RETURN> or <ARROW_UP>.

If a new key has been read (regardless of whether it is an ASCII or Unicode keystroke), it is added to the current command line represented by the DCLP internal variable keytable. Adding this new key means that it is either inserted to the end of the current command line or an existing key is overwritten by this new one. If the new key is added, the variable keytable.num will be incremented by one.

In one or more embodiments, if a special key has been read, the input handler checks to ascertain the special key. Table 1 summarizes actions, in accordance with one or more embodiments, of the DCLP in cases of a particular special key.

TABLE 1

Special key actions of DCLP input handler

| Special Key | Action |
|---|---|
| TAB | Ignore |
| DEL | If current command line contains characters (keytable.num > 0): <br>   delete character the (keytable.nextKeyIdx -1) variable refers to <br>   decrement keytable.nextKeyIdx <br>   decrement keytable.num <br> else /* current command line is empty (keytable.num == 0): */ <br>   ignore |
| RETURN | If current command line contains characters (keytable.num > 0): <br>   copy keytable contents to static output buffer for CLI application to read <br>   add variable keytable to history_keytable[ ] <br>   reset keytable.nextKeyIdx = 0 <br>   reset keytable.num = 0 <br>   Return to calling function |

TABLE 1-continued

Special key actions of DCLP input handler

| Special Key | Action |
|---|---|
| ARROW_UP/ ARROW_DOWN | If at least one previous command line available (numTotalHistoryKeys > 0) <br>   copy suitable previous command line to variable keytable <br>   update keytable.nextKeyIdx according to previous command line <br>   update keytable.num according to previous command line <br> else /* no previous command line available (numTotalHistoryKeys == 0) */ <br>   ignore |
| ARROW_LEFT/ ARROW_RIGHT | If current command line contains characters (keytable.num > 0): <br> if ARROW_LEFT <br> if keytable.nextKeyIdx > 0 : <br>   decrement variable keytable.nextKeyIdx <br> else <br>   ignore <br> else /* must be ARROW_RIGHT */ <br> if keytable.nextKeyIdx == keytable.num : <br>   ignore <br> else <br>   increment variable keytable.nextKeyIdx <br> If current command line is empty (keytable.num == 0): <br>   ignore |

In order to check if new keys are pending in stdin and are ready to get processed, the select( ) function is used with a very small timeout value. The DCLP input handler invokes a particular function called isNewInputPending( ) to perform the select( ) operation. This function is set forth just below:

static int
    is NewInputPending(void) {
    struct timeval tv={0, 1}; /* 1 usec max check time */
    fd_set readset;
    FD_ZERO(&readset);
    FD_SET(fileno(stdin), &readset);
    return select(fileno(stdin)+1, &readset, NULL, NULL, &tv);
    }

The above-described implementation checks a maximum of 1 µsec for pending stdin input.

Parsing Example

This section illustrates what happens with the keytable variable in a case in which a user inserts a string on the command line, edits it, and then finally presses the <RETURN> key.

Figure 4:
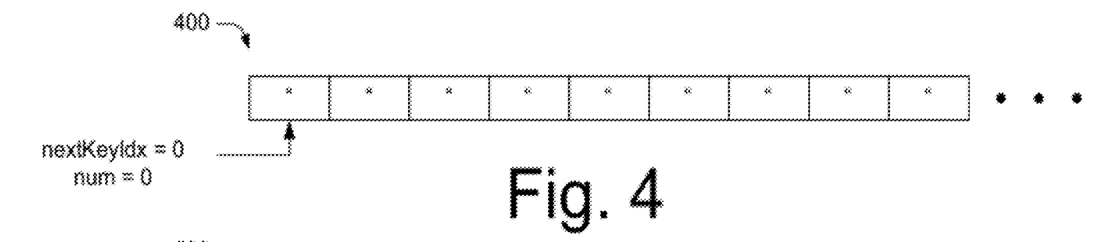
FIG. 4 illustrates a state of a keytable in accordance with one or more embodiments.
Figure 5:
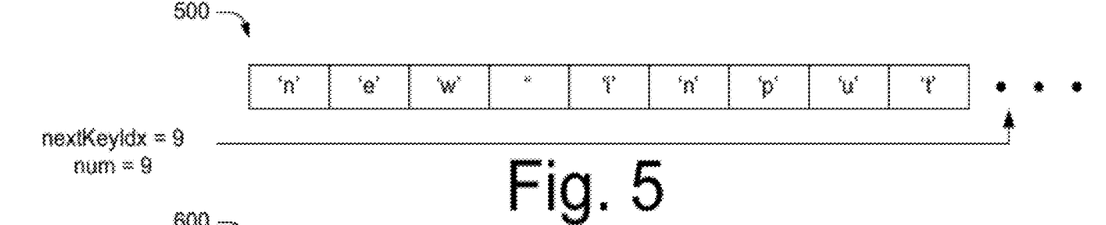
FIG. 5 illustrates another state of the keytable in accordance with one or more embodiments.

FIG. 4 illustrates, generally at 400, an initial state of the keytable after invocation of dclp_readline( ). When the user has added some characters, the updated key tablevariable may look as shown in FIG. 5 at 500.

After the insert characters, the nextKeyIdx variable points to the tenth element (nextKeyIdx==9!) of the keytable array. Any new character will be placed at this index, and nextKeyIdx will be incremented by one.

Figure 6:
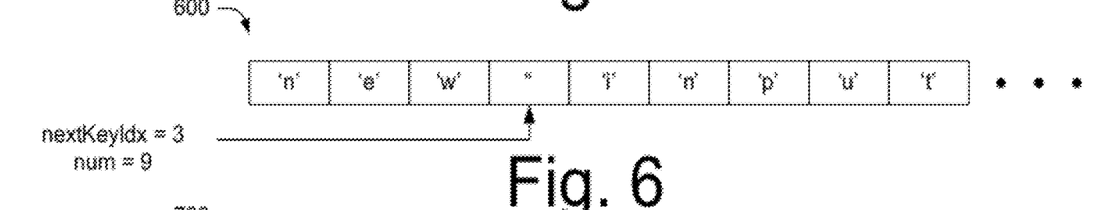
FIG. 6 illustrates another state of the keytable in accordance with one or more embodiments.

Assume now that the user presses the <ARROW_LEFT> key six times. FIG. 6 illustrates, generally at 600, the cursors's position after performing this action. Notice that the content of the keytable variable stays the same (i.e., the total number of keycodes has not changed, num==9), but the cursor moved to the location of the nextKeyIdx. After six <ARROW_LEFT> keystrokes, the cursor has moved six times to the left. The variable nextKeyIdx is now three.

Figure 7:
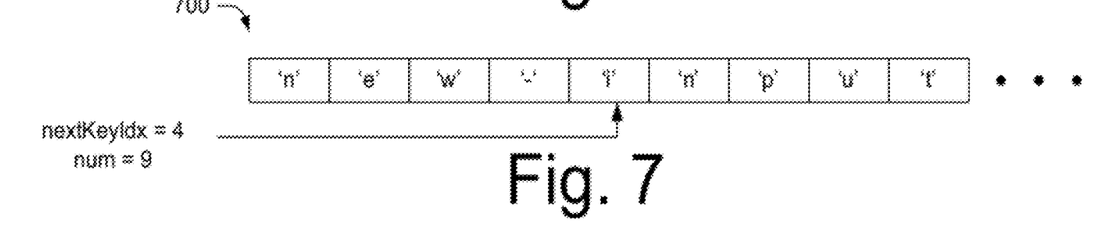
FIG. 7 illustrates another state of the keytable in accordance with one or more embodiments.

Now assume the user presses the underscore '_' key, which overwrites the existing space character currently stored at nextKeyIdx 3 (assuming character overwrite mode is active). The state of the keytable is shown in FIG. 7 generally at 700. Again, the total number of keycodes has not changed (num==9) but the cursor location has been incremented by one. The variable nextKeyIdx is now four.

Figure 8:
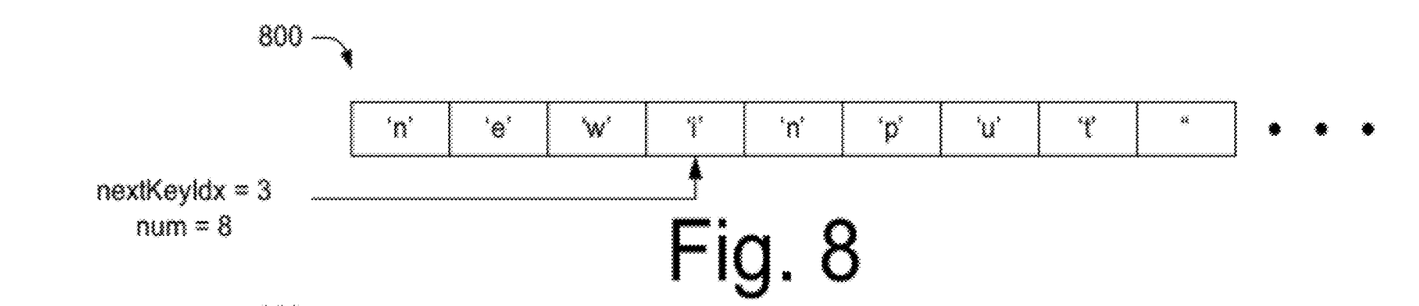
FIG. 8 illustrates another state of the keytable in accordance with one or more embodiments.

Assume now that the last edit of the user is a deletion. The user presses the <DEL> key once, which leads to the deletion of the underscore '_' character. This is due to the fact that the current cursor position is on the character following the underscore '_'. The state of the keytable is shown in FIG. 8 generally at 800. After the deletion, both nextKeyIdx and num variables have changed. The total number of keycodes has been decremented by one (num==8) and the current cursor has also moved to the left (nextKeyIdx==3).

Figure 9:
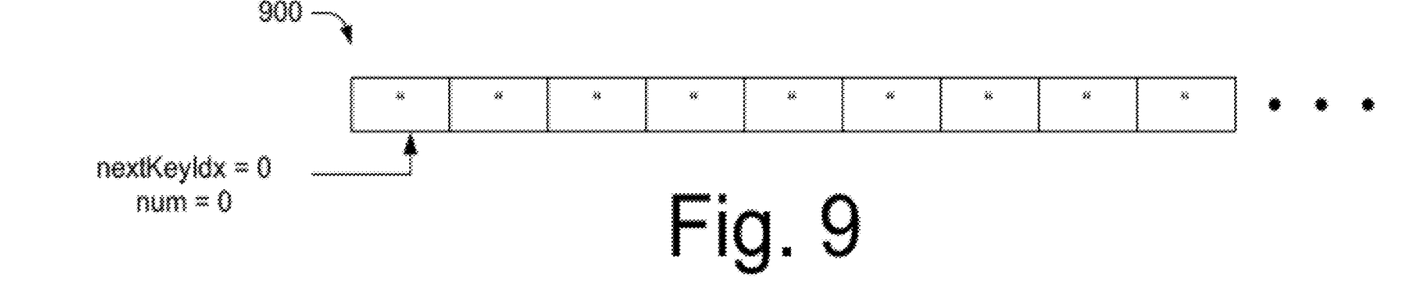
FIG. 9 illustrates another state of the keytable in accordance with one or more embodiments.

Now the user confirms this command line by pressing <RETURN>. The current contents of the keytable variable will be added to the history_keytable[ ]. After this, the keytable variable will be reset, waiting for any new data to be handled. The state of the keytable at this point is shown in FIG. 9, generally at 900.

Flushing Output

In one or more embodiments, updates in the command line are written immediately to stdout. Due to the fact that the noncanonical mode only applies to the input and not to any output, the DCLP explicitly flushes stdout.

The following code snippet shows how the DCLP sends data to stdout and then flushes it.

define MAX_LEN_OUTPUT_BUFFER=80;
char output[MAX_LEN_OUTPUT_BUFFER];
memset(output, 0x00, sizeof(output));
strcpy(output, "sample_output");
write(fileno(stdout), (void *) output, strlen(output));
fflush(NULL); /* flush all pending streams */

Sample Usage

The following code snippet illustrates the use of the DCLP in a plain Linux CLI application. Each time a command line is confirmed by the user, the prompt for the next command line is dynamically updated with a sequence counter.

```
#include <stdio.h>
#include "dclp.h"
int
main(int argc, char *argv) {
    char *input = NULL;
    dclp_init(NULL); /* use default prompt at init time */
    do {
        char update_prompt_buffer[32] = " ";
        int counter = 0;
        counter++;
        sprintf(update_prompt_buffer, "(prompt %i)$ ", counter);
        dclp_setprompt(update_prompt_buffer);
        int retval = dclp_readline(&input);
        printf("\nnew input line is %s\n", input);
    } while (strcmp(input, "quit"));
    return 0;
}
```

File Layout

In one or more embodiments, the DCLP library is built from a number of files. The organization of those files reflects the operating system generic approach of the DCLP library design. One header and one source file deal with the generic, public DCLP interface, whereas other header and source files deal with private operating system specific implementations.

As the above example is taken in the context of a Linux operating system, the list of operating system specific files in Table 2 below includes Linux-related information.

TABLE 2

Source and header files of the DCLP library

| File | Used by | Description |
| --- | --- | --- |
| dclp.h | All operating systems | Prototypes of the public DCLP functions |
| dclp.c | All operating systems | Implementation of the public DCLP functions |
| dclp_linux.h | Linux | Prototypes of the private Linux DCLP functions |
| dclp_linux.c | Linux | Implementation of the private Linux DCLP functions |
| makefile.linux | Linux | Linux specific DCLP functions |

Extensions

Various extensions can be provided in accordance with one or more embodiments. These extensions include, by way of example and not limitation, an insert mode, an advanced history search, special keys notification, and multiple operating system support, each of which is discussed under its own heading below.

Insert Mode

In the embodiments described above, if the command line is edited and the cursor is located over an existing character and a new key is pressed, the new character overwrites the existing character. In some embodiments, an insert mode is provided in which the new character is added before the existing one and hence the current string is extended by one character.

In at least some embodiments, the default insert mode depends on the platform. Based on this current default value, the second insert mode may be enabled or disabled at runtime using a new public function called dclp_insertmode(int enable), where the enable parameter enables or disables this second insert mode.

Advanced History Search

In the above-described embodiments, all previous commands can be browsed via the <ARROW_UP> and <ARROW_DOWN> keys. To browse recent commands, this method is adequate, but if the number of maintained history command lines gets longer, then advanced searching can be used.

In one or more embodiments, the advanced search can be triggered by <CTRL-R> (reverse search) or <CTRL-F> (forward search) so that the user can search a particular pattern. A pattern refers to a sequence of one or more characters that may be located in a list of previous commands. Consider the following list of previous commands:

"the first command line"
"another command line"
"last command line (third)"

If the user triggers <CTRL-R>, the user can provide one or more characters which are searched in the list of previous command lines. If, for example, the user provides the three characters "the", the very first previous command line will be displayed:

"the first command line"

As a next step, the user may then append some new data to this string and confirm this new string by typing <RETURN>. The new data appended to this string is shown just below:

"the first command line was updated"

The final list of previous commands after this user action would take the following form:

"the first command line"
"another command line"
"last command line (third)"
"the first command line was updated"

Special Keys Notification

In the above-described embodiment, the DCLP focuses on the command line history. That is, <ARROW_UP> and <ARROW_DOWN> keys can be used by the user to navigate through previous commands. Any special key like the <ARROW_UP> key is only used by the DCLP internally, and is not propagated to the invoking application.

In at least some embodiments, a notification mechanism can be utilized so that the application which uses the DCLP receives an indication of whether <ARROW_UP> is pressed or not. In addition to the plain command line history implementation, this can be used by the application to perform special actions.

This notification mechanism can be implemented using a callback function. Specifically, upon striking a special key, this callback function can be called by the DCLP so that the application can perform corresponding actions. For example, a special action can include those that can be used through a mechanism similar to a slider in graphical user interface (GUI) applications. GUI applications frequently offer the possibility to change a particular value by using a slider control (e.g. to change desktop background color). In some instances, the DCLP may use the <ARROW-LEFT> and <ARROW-RIGHT> keys to also change a particular value dynamically. This may be used at calibration or testing of hardware. For example, the user may state a command and after this dynamically adapt command parameters using <ARROW-LEFT> or <ARROW-RIGHT> keys without the need to explicitly state a tedious sequence of slightly changed commands.

For instance, consider if the user wishes to verify the maximum output power level of a WLAN card. One parameter is the channel being used. Another parameter is the power level expressed in dBm. Using <ARROW-UP> and <ARROW-DOWN> keys, the user may switch the channel being used. Using the <ARROW-LEFT> and <ARROW-RIGHT> may change the dBm power level.

By using this approach, the user may easily browse over possible combinations without stating a tedious sequence of slightly changed commands. In essence, any special action which utilizes direct user input may be implemented, because the DCLP is aware of the user input (i.e., the keys pressed). The described slide feature above is just one example of how this can be implemented.

Multiple Operating System Support

The above-described embodiments of the DCLP already assume that its code is used on multiple operating systems. These other operating systems can include, by way of example and not limitation, Windows® and/or Mac OSX, to name just a few. The operating system-specific DCLP code can be maintained similar to the existing Linux code. That is, it can include the use of one header file with the prototypes and one source file including the implementation. Therefore, the implementation for Windows® would include both files dclp_windows.h and dclp_windows.c.

Example Method

Figure 10:
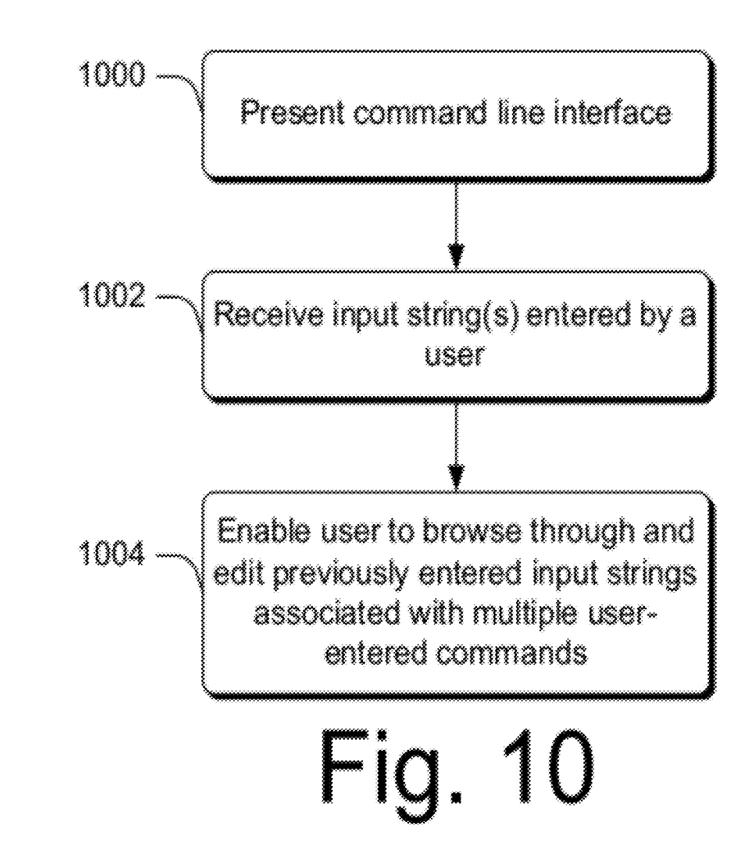
FIG. 10 illustrates a flow diagram that describes a method in accordance with one or more embodiments.

FIG. 10 is a flow diagram that describes a method in accordance with one or more embodiments. The method can be implemented in connection with any suitable hardware, software, firmware, or combination thereof. In at least some embodiments, the method can be implemented by a suitably-configured direct command line parser, such as direct command line parser 110 in FIG. 1.

Step 1000 presents a command line interface. In one or embodiments, the command line interface is configured to enable a user to enter input strings corresponding to commands. Step 1002 receives one or more input strings entered by the user. Step 1004 enables a user to browse through and edit previously entered input strings associated with multiple user-entered commands.

CONCLUSION

The various embodiments described above provide a direct command line parser (DCLP) that enables command line input to be handled directly as a user strikes a key. Specifically, instead of waiting for the user to confirm a complete command line by pressing the Enter key, key input is evaluated immediately as the user inputs individual keystrokes. User input can include, by way of example and not limitation, ordinary ASCII and UNICODE characters as well as control keys such as <Tab>, <Arrow Up>, <Arrow Down>, and the like.

In addition, various embodiments can enable a user's input to be parsed directly and provide a command history for CLI applications. Using the inventive approach, various shells such as UNIX shells, can enable previously executed commands to be retrieved, edited, and executed again through the use of particular keystrokes such as, for example, the <Arrow Up> and <Arrow Down> keys. In addition, the inventive approach provides a user-friendly feature which can easily accommodate a large variety of CLI applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more computer readable storage media; and
a direct command line parser embodied on the one or more computer readable storage media and configured to interface with one or more applications, the direct command line parser comprising:
 a generic direct command line parser module configured to expose a set of public interfaces to said one or more applications; and
 one or more system-specific direct command line parser modules configured to expose a set of private interfaces to said generic direct command line parser module, wherein at least one of the public interfaces or the private interfaces enable selection of two or more keys to browse through and edit previously entered input strings, at least one of the two or more keys configured to enable browsing up or down through the previously entered input strings, and at least another one of the two or more keys configured to enable searching for a particular pattern in the previously entered input strings.

2. The system of claim 1, wherein the one or more system-specific direct command line parser modules comprise operating system-specific direct command line parser modules, each operating system-specific direct command line parser module being specific to a particular operating system.

3. The system of claim 1, wherein the direct command line parser modules reside as a static library that can be linked to said one or more applications.

4. The system of claim 1, wherein the public interfaces include functions comprising one or more of: an initialization function, a set prompt function or a read line function.

5. The system of claim 1, wherein the public interfaces include a read line function that is configured to enable a user to browse through and edit the previously entered input strings.

6. The system of claim 1, wherein the private interfaces include functions comprising one or more of: a disable canonical mode function, an enable canonical mode function, a read line function, or a set prompt function.

7. The system of claim 1, wherein:
the public interfaces include functions comprising one or more of: an initialization function, a set prompt function or a read line function; and
the private interfaces include functions comprising one or more of: a disable canonical mode function, an enable canonical mode function, a read line function, or a set prompt function.

8. The system of claim 1, wherein the private interfaces include a read line function that is configured to enable a user to browse through and edit the previously entered input strings.

9. The system of claim 1, wherein the public interfaces include a first read line function that is configured to enable a user to browse through and edit the previously entered input strings; and wherein the private interfaces include a second read line function that is configured to enable a user to browse through and edit the previously entered input strings.

10. The system of claim 1, wherein the direct command line parser is configured to use a first data structure to maintain individual single characters entered by a user and a second data structure to maintain control fields for each command line and data maintained by the first data structure.

11. The system of claim 1, wherein the direct command line parser is configured to store a current command line that a user is editing and one or more previous command lines that a user has entered.

12. The system of claim 1, wherein the direct command line parser is configured to store an overwritable character array that can be filled with values that an application can use as a prompt.

13. The system of claim 1, wherein the direct command line parser is configured to support an insert mode in which a new character is added before an existing one to extend a current string by one character.

14. The system of claim 1, wherein the direct command line parser is configured to support an advanced history search that can be triggered to conduct a reverse search or a forward search.

15. The system of claim 1, wherein the direct command line parser is configured to support a special key notification in which a callback function is used to enable said one or more applications to perform a corresponding action responsive to a special key being entered by a user.

16. The system of claim 1, wherein the direct command line parser is configured to support multiple operating systems.

17. A method comprising:
presenting a command line interface that is configured to enable a user to enter input strings corresponding to commands;
receiving one or more input strings entered by the user; and
enabling the user to select two or more keys to browse through and edit previously entered input strings associated with multiple user-entered commands, at least one of the two or more keys configured to enable browsing up or down through the previously entered input strings, and at least another one of the two or more keys configured to enable searching for a particular pattern in the previously entered input strings, wherein said presenting, receiving, and enabling are performed by a direct command line parser through the use of a set of public interfaces that are exposed to one or more applications, and a set of private interfaces that are not exposed to said one or more applications.

18. The method of claim 17 further comprising evaluating at least portions of an input string without requiring the user to press an Enter key.

19. The method of claim 17, wherein:
said set of public interfaces includes a first read line function that is configured to enable the user to browse through and edit the previously entered input strings; and
said set of private interfaces includes a second read line function that is configured to enable the user to browse through and edit the previously entered input strings.

20. The method of claim 17 further comprising enabling a canonical mode to be enabled and disabled.

21. The method of claim 17, wherein said presenting enables the user to enter commands associated with an operating system.

22. The method of claim 17, wherein said presenting enables the user to enter commands associated with multiple operating systems.

23. The method of claim 17, wherein said receiving comprises receiving input strings comprising ASCII characters.

24. The method of claim 17, wherein said receiving comprises receiving input strings comprising UNICODE characters.

25. The method of claim 17, wherein said receiving and said enabling are performed using a first data structure to maintain individual single characters entered by the user and a second data structure to maintain control fields for each command line and data maintained by the first data structure.

26. The method of claim 17 further comprising maintaining an overwriteable character array that can be filled with values that an application can use as a prompt.

27. The method of claim 17 further comprising supporting an insert mode in which a new character is added before an existing one to extend a current string by one character.

28. The method of claim 17 further comprising supporting an advanced history search that can be triggered to conduct a reverse search or a forward search.

29. The method of claim 17 further comprising supporting a special key notification in which a callback function is used to enable one or more applications to perform a corresponding action responsive to a special key being entered by the user.

* * * * *